(12) United States Patent
Kang et al.

(10) Patent No.: US 7,965,006 B2
(45) Date of Patent: Jun. 21, 2011

(54) DEVICE FOR GENERATING STIFFNESS AND JOINT OF ROBOT MANIPULATOR COMPRISING THE SAME

(75) Inventors: Sung Chul Kang, Seoul (KR);
Munsang Kim, Seoul (KR); Seung Jong Kim, Seoul (KR); Seung Kook Yun, Seoul (KR); Jeonghoon Yoo, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 324 days.

(21) Appl. No.: 12/439,938

(22) PCT Filed: Dec. 7, 2006

(86) PCT No.: PCT/KR2006/005282
§ 371 (c)(1),
(2), (4) Date: Mar. 4, 2009

(87) PCT Pub. No.: WO2008/029969
PCT Pub. Date: Mar. 13, 2008

(65) Prior Publication Data
US 2010/0192719 A1    Aug. 5, 2010

(30) Foreign Application Priority Data

Sep. 4, 2006 (KR) .................. 10-2006-0084668

(51) Int. Cl.
*H02K 49/00* (2006.01)
(52) U.S. Cl. ........................ 310/103; 310/191
(58) Field of Classification Search .................. 310/103, 310/191, 179–180, 254.1, 261.1
See application file for complete search history.

(56) References Cited

U.S. PATENT DOCUMENTS 4,609,862 A * 9/1986 Becker et al. .................. 322/90
(Continued)

FOREIGN PATENT DOCUMENTS

JP          07-101252 A       4/1995
(Continued)

OTHER PUBLICATIONS

G. Hirzinger et al., "DLR's torque-controlled light weight robot III—are we reaching the technological limits now?," Proceedings of the 2002 IEEE Conference on Robotics & Automation, Washington, DC, May 2002, pp. 1710-1716.

(Continued)

*Primary Examiner* — Thanh Lam
(74) *Attorney, Agent, or Firm* — Jones Day (57) ABSTRACT

A device for generating and varying stiffness, which may be applied to a joint of a robot manipulator, the stiffness generating device having a rotating shaft connected to a driven member; a rotor fixed to the rotating shaft and having arms comprising a magnetic element; a stator disposed to surround the rotor outside the arms and being connected to a drive motor; electromagnets fixed to an inner periphery of the stator and being opposed to each other about the rotating shaft, each having a core and a coil wound around the core; and means for applying current to the coils. One half of the electromagnets has N-poles at their inward ends and the other half of the electromagnets has S-poles at their inward ends. Current regulating means regulates the current being applied to the coils.

15 Claims, 6 Drawing Sheets

U.S. PATENT DOCUMENTS

| | | | | |
|---|---|---|---|---|
| 5,376,862 A | * | 12/1994 | Stevens | 310/75 D |
| 5,539,266 A | * | 7/1996 | Stevens | 310/75 D |
| 7,423,506 B2 | * | 9/2008 | Terasaki | 335/306 |
| 7,626,297 B2 | * | 12/2009 | Brown | 310/103 |

FOREIGN PATENT DOCUMENTS

| | | |
|---|---|---|
| JP | 2001-190058 A | 7/2001 |
| JP | 2003-166554 A | 6/2003 |
| KR | 10-2004-0068688 A | 8/2004 |
| KR | 10-2005-0076904 A | 7/2005 |

OTHER PUBLICATIONS

Munsang Kim, et al., "Safe Arm Design for Service Robot," second IARP-IEEE/RAS Joint Workshop on Technical Challenge for Dependable Robots in Human Environment, Korea Institute of Science & Technology, 2002, pp. 88-95.

Toshio Morita and Shigeki Sugano, Development of One-D.O.F. Robot Arm equipped with Mechanical Impedance Adjuster, IEEE/RSJ International Conference on Intelligent Robots and Systems, 1995, pp. 407-412.

* cited by examiner

DEVICE FOR GENERATING STIFFNESS AND JOINT OF ROBOT MANIPULATOR COMPRISING THE SAME

TECHNICAL FIELD

The present invention generally relates to a device for generating stiffness, and more particularly to a device for generating variable stiffness by using a magnetic force, which can be applied to a joint of a robot manipulator.

BACKGROUND ART

As examples of prior art for providing stiffness, which are applied to joints of a robot manipulator, there is one approach that uses a mechanical spring. Further, there is another approach that detects forces exerted on a manipulator and controls a drive motor of a joint accordingly to accomplish the effect of virtual spring without any additional mechanism.

A document entitled "The second IARP-IEEE/RAS Joint Workshop on Technical Challenge for Dependable Robots in Human Environment" (KOREA INSTITUTE OF SCIENCE AND TECHNOLOGY, pp. 88-95, 2002) discloses "Safe arm design for service robot" (Kim). The arm design disclosed in such a document enhances safety of a manipulator by additionally mounting a mechanical spring to a joint of a robot. It is configured such that linear springs are disposed in a rotation direction so as to function like rotation springs. However, it operates only with determined spring constant and controlling its stiffness according to its operation is impossible.

Further, another document entitled "The IEEE/RSJ International Conference on Intelligent Robots and Systems" (pp. 508-412, 1995) discloses "Development of one-D.O.F robot arm equipped with mechanical impedance adjuster" (Morita and Sugano). The robot arm disclosed in such a document is configured to adjust a length of a plate spring by changing a stationary point (center of motion) of the plate spring along a linear guide by means of a separate drive mechanism to thereby control stiffness. In said robot arm, however, although variable stiffness is possible according to each state, additional mechanism must be driven for its operation. Thus, there is a problem in that stiffness cannot be rapidly varied.

Furthermore, many attempts have been made with regard to approaches for controlling a joint to show the effect of virtual spring by using a force sensor. As one example, a document entitled "The Intl. Conf. On Robotics and Automations" (pp. 1710-1716, 1002.) discloses "DLR's torque-controlled light weight robot iii" (Hirzinger). The light weight robot disclosed in such a document is configured to mount a sensor, which is capable of measuring force or torque, to an end portion of a robot manipulator or a joint portion of a link, while controlling a controller to show the effect of virtual spring based on inputted sensor information. In said light weight robot, however, although the spring effect is shown without any separate mechanism, there is no measure or remedy in case of an electrical breakdown. Further, there is a problem in that efficiency and performance are low since position control and force control are carried out by a single controller.

DISCLOSURE OF INVENTION

Technical Problem

The present invention is directed to solving the foregoing problems. It is an object of the present invention to provide a stiffness generating device, which generates stiffness by using magnetic force and can be applied to a joint connecting a driven member and a drive motor for driving the driven member.

It is a further object of the present invention to provide a stiffness generating device, which generates stiffness by using magnetic force and can vary the generated stiffness.

It is another object of the present invention to provide a joint of a robot manipulator configured such that variable stiffness is given to rotation of a link.

Technical Solution

In order to achieve the above and other objects, according to one aspect of the present invention, there is provided a device for generating stiffness, comprising: a rotating shaft connected to a driven member; a rotor fixed to the rotating shaft and having arms comprising a magnetic element; a stator disposed so as to surround the rotor outside the arms and being connected to a drive motor for driving the driven member to be rotated by a rotation of the drive motor; a plurality of electromagnets fixed to an inner periphery of the stator so as to be apart from the arms by a predetermined gap and to be opposed to each other about the rotating shaft, wherein each electromagnet has a core radially oriented with respect to the rotating shaft and a coil wound around the core; and means for applying a current to the coils; wherein the coils of one half of the electromagnets are wound so that N-poles are formed at ends thereof facing toward the rotating shaft, and wherein the coils of the other half of the electromagnets are wound so that S-poles are formed at ends thereof facing toward the rotating shaft.

The electromagnets forming the N-poles are fixed to one of halved sections of the inner periphery of the stator and the electromagnets forming the S-poles are fixed to the other of the halved sections. The electromagnets in each halved section are configured so that the coils thereof are wound in such number of turns as linearly diminish from the electromagnet located centrally toward the electromagnets located laterally. In such a case, each arm may have a permanent magnet and the stator may be configured to have an elliptical cross-section. The rotor may further have a rotor coil wound around the arm. The current applying means applies a current to the rotor coil.

Further, the rotor may have four arms. In such a case, the electromagnets forming the N-poles are fixed to two opposed sections of quartered sections of the inner periphery of the stator, while the electromagnets forming the S-poles are fixed to the other of the quartered sections. The electromagnets in each quartered section are configured so that the coils thereof am wound in such number of turns as linearly diminish from the electromagnet located centrally toward the electromagnets located laterally. The rotor may further have a rotor coil wound around the arm. The current applying means applies a current to the rotor coil.

Also, the stiffness generating device further comprises a current regulating means disposed between the current applying means and the coils for regulating a magnitude of a current being applied to the coils.

According to a further aspect of the present invention, there is provided a device for generating stiffness, comprising: a rotating shaft connected to a driven member; a cylindrical rotor fixed to the rotating shaft; a plurality of electromagnets fixed to an outer periphery of the rotor, wherein each electromagnet has a core radially oriented with respect to the rotating shaft and a coil wound around the core; a stator disposed so as to surround the rotor outside the electromagnets and being connected to a drive motor for driving the driven member to be rotated by a rotation of the drive motor, wherein the stator has a magnetic element on an inner periphery thereof; and means for applying a current to the coils; wherein the coils of one half of the electromagnets are wound so that N-poles are formed at ends thereof facing toward the rotating shaft, and wherein the coils of the other half of the electromagnets are wound so that S-poles are formed at ends thereof facing toward the rotating shaft.

The electromagnets forming the N-poles are fixed to one of halved sections of the outer periphery of the rotor and the electromagnets forming the S-poles are fixed to the other of the halved sections. The electromagnets in each halved section are configured so that the coils thereof are wound in such number of turns as linearly diminish from the electromagnet located centrally toward the electromagnets located laterally. The stiffness generating device further comprises a current regulating means disposed between the current applying means and the coils for regulating a magnitude of a current being applied to the coils.

According to another aspect of the present invention, there is provided a device for generating stiffness, comprising: a rotating shaft connected to a driven member; a ring-like rotor fixed to the rotating shaft and including even permanent magnets; and a stator disposed so as to surround the rotor coaxially with the rotating shaft and being connected to a drive motor for driving the driven member so as to be rotated by a rotation of the drive motor, wherein the stator includes as many permanent magnets as the permanent magnets of the rotor.

In such a case, the stiffness generating device further comprises a rotor displacing means for moving the rotor relatively with respect to the stator in an axial direction of the rotating shaft. The rotor displacing means comprises a screw axially screw-engaged to the rotating shaft and a motor for driving the screw.

According to yet another aspect of the present invention, there is provided a joint of a robot manipulator for connecting a link constituting a robot manipulator and a drive motor having a drive shaft and driving the drive shaft. The joint comprises the above-described stiffness generating device, wherein the rotating shaft of the device is connected to the link and the stator of the device is connected to the drive shaft.

In this case, the joint further comprises a sensor fixed to one of the rotor and the stator for detecting a relative displacement between the rotor and the stator.

Advantageous Effects

The stiffness generating device of the present invention can generate stiffness with a simpler constitution than that of the prior art by generating stiffness through using magnetic force of electromagnets or permanent magnets.

In case of the stiffness generating device using the electromagnets, since stiffness is generated and the generated stiffness is varied by application of current without additional control, the generation and variation of stiffness are accomplished with a simpler constitution compared to complicated control of the prior art.

In case of the stiffness generating device using the permanent magnets, the generation and variation of stiffness are accomplished with a simple constitution and a rapid control.

BEST MODE FOR CARRYING OUT THE INVENTION

A stiffness generating device and a joint of a robot manipulator comprising the same will now be described in detail with reference to the accompanying drawings.

Figure 1:
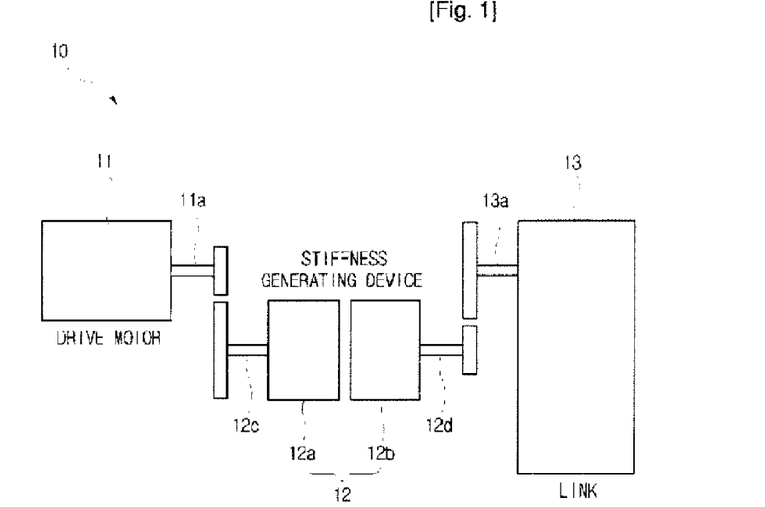
FIG. 1 is a block diagram showing a constitution of a joint of a robot manipulator according to the present invention.

A stiffness generating device of the present invention is mounted to a joint joining a driven member and a motor for driving said driven member. The stiffness generating device converts rotation of the drive motor into rotation of the driven member while providing stiffness to the rotation of the driven member. The stiffness generating device of the present invention can be applied to a joint of a robot manipulator. In such a case, the driven member may be a link of the robot manipulator and the drive motor may be a drive motor of the robot manipulator. FIG. 1 is a block diagram showing a constitution of a robot manipulator including the stiffness generating device of the present invention.

Referring to FIG. 1, a joint 10 of a robot manipulator includes: a link portion 13 constituting the robot manipulator; a drive motor 11 for driving the link portion 13; and a stiffness generating device 12 for joining the drive motor 11 and the link portion 13. The stiffness generating device 12 includes a stator portion 12a connected to a drive shaft 11a of the drive motor and a rotor portion 12b connected to a rotating shaft 13a of the link portion 13.

A rotating element 12c, which is provided at an input side of the stiffness generating device 12 and is coupled to the stator portion 12a, may be directly engaged to the drive shaft 11a of the drive motor 11 or may be connected via a reduction gear. A rotating element 12d, which is provided at an output side of the stiffness generating device 12 and is coupled to the rotor portion 12b, may be directly engaged to the rotating shaft 13a of the link portion 13 or may be connected via a reduction gear. Rotation of the stator portion 12a is effectuated by the rotation of the drive motor 11. Further, the rotor portion 12b is rotated by the rotation of the stator portion 12a via a magnetic force. Thus, the rotation of the drive motor 11 is transmitted to the link portion 30 through the stiffness generating device 12, thereby effectuating the rotation of the link portion 30. In such a case, stiffness is provided to the rotation of the link portion 30 by means of the stiffness generating device 12.

Figure 2:
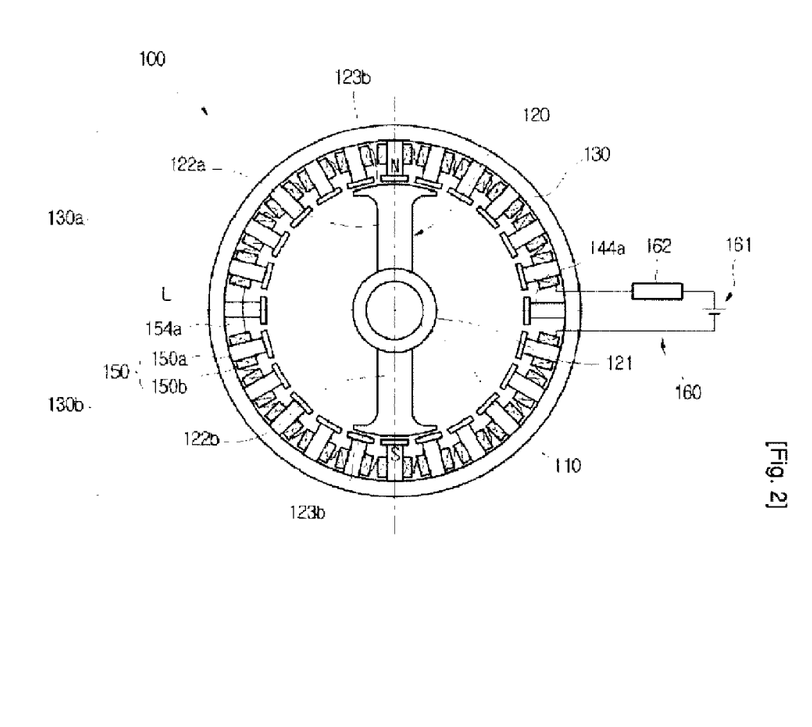
FIG. 2 is a sectional view showing a stiffness generating device according to a first embodiment of the present invention.

FIG. 2 is a sectional view showing a stiffness generating device according to a first embodiment of the present invention.

Referring to FIG. 2, a stiffness generating device 100 of this embodiment comprises the following: a rotating shaft 110 connected to a driven member; a rotor 120 fixedly coupled to the rotating shaft 110 to be rotated together with the rotating shaft 110; a stator 130 disposed so as to surround the rotor 120 and being connected to a drive motor for driving the driven member to be rotated by a rotation of the drive motor; and a plurality of electromagnets 140, 150 disposed in a circumferential direction of the stator 130.

The rotating shaft 110 is connected to the driven member at its one end portion to thereby serve to transmit the rotation of the drive motor to the driven member. The driven member comprises a link constituting a robot manipulator.

The rotor 120 is an element moving relatively with respect to the stator 130. The rotor includes: a hub 121 fixed to the rotating shaft 110; a pair of arms 122a, 122b oppositely extending from the hub 121; and reaction portions 123a, 123b formed at distal ends of respective arms. The reaction portions 123a, 123b have a circular arc shape. The rotor 120 or the arms 122a, 122b and the reaction portions 123a, 123b are comprised of a magnetic material to be attracted by a magnetic force (e.g., metal).

The stator 130 is an element moving relatively with respect to the rotor 120. The stator 130 has a ring or cylinder shape sufficient enough to contain a circle, which the reaction portions 123a, 123b of the rotor 120 form. The stator 130 is connected to a drive shaft (not shown) of the drive motor and is rotated by the rotation of the drive motor. Said drive motor may be the drive motor 12 of the robot manipulator as shown in FIG. 1. Accordingly, the stator 130 is directly coupled to the drive shaft 11a of the drive motor 11 of the robot manipulator or is connected to the drive shaft 11a via other fixing elements.

The electromagnets 140, 150 are fixedly disposed on an inner periphery of the stator 130. When the drive motor rotates, the stator 130 is rotated accordingly. Then, the rotor 120 (more specifically, the arms 122a, 122b and the reaction portions 123a, 123b) is allowed to be attracted in a rotation direction of the stator 130 by magnetic forces of the electromagnets 140, 150 between the stator 130 and the rotor 120. In this way, the rotation of the drive motor is converted into the rotation of the driven member by means of the stiffness generating device 100.

Each electromagnet 140, 150 includes a rod-shaped core and a coil wound around the core. The cores 140a, 150a are radially arranged about a center of the rotating shaft 110 and are disposed on the stator 130 at equal intervals. One ends of the cores 140a, 150a are fixed to the inner periphery of the stator 130, while the other ends of the cores are spaced apart from the reaction portions 123a, 123b by a predetermined gap. The cores 140a, 150a are comprised of a magnetizable material.

A winding arrangement of the coil 140b, 150b around the cores 140a, 150a is described with reference to FIGS. 2 and 3. For ease of description, in FIGS. 2 and 3, one halved section of the inner periphery of the stator, which is above a center line L, is referred to as a first section 130a. Further, the other halved section of the inner periphery of the stator, which is below the center line, is referred to as a second section 130b.

Figure 3:
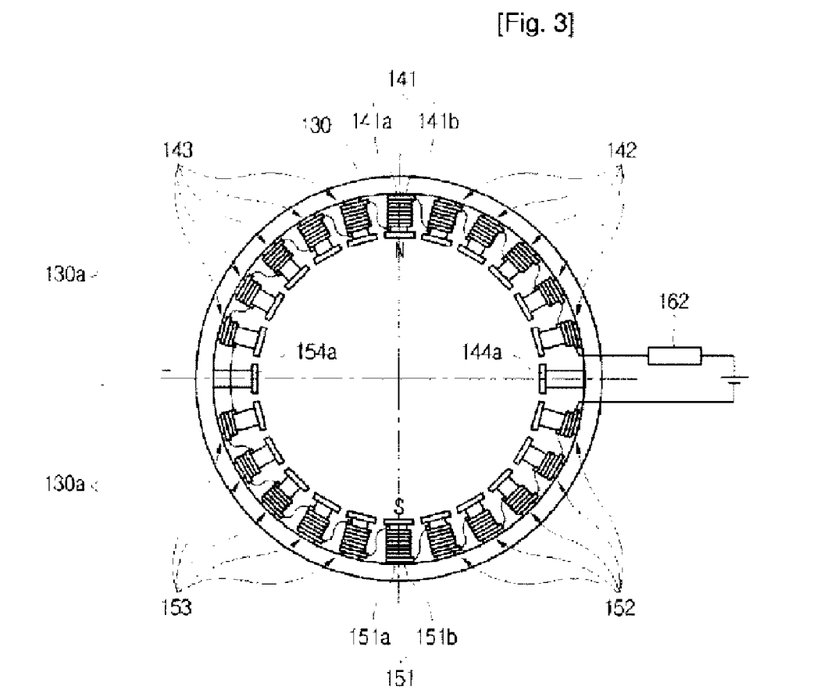
FIG. 3 is a partial sectional view of the stiffness generating device of FIG. 2 and shows a coil winding arrangement.

FIG. 3 is a partial sectional view of the stiffness generating device 100 and shows each coil wound around each core. Referring to FIGS. 2 and 3, in the first section 130a of the stator, the coils are wound around the respective cores so that N-poles are formed at the other ends of the cores facing toward the rotation shaft 110 or the rotor 120. Preferably, the number of turns of the coil 141b wound around the core 141a located uppermost is maximum and the numbers of turns of the coils of the electromagnets 141, 143 diminish linearly. This is so that the electromagnet 141 located in the center of the first section 130a generates a maximum magnetic force, while the electromagnets 142, 143 located at both lateral sides of the electromagnet 141 generate magnetic forces that are linearly decreased toward the center line L.

In case of the second section 130b of the stator, the coils are wound around the respective cores so that magnetic poles (e.g., S-poles) opposed to the magnetic poles (e.g., N-poles), which are formed at the other ends of the cores of the electromagnets located in the first section 130a, are made. In other words, the coils are wound around the cores pertaining to the second section 130b in an opposite direction to a winding direction of the coils wound around the cores pertaining to the first section 130a. Further, similar to the first section 130a, the electromagnet 151 has the maximum number of turns and the electromagnets 152, 153 located at both lateral sides of the electromagnet 151 have the number of turns linearly diminishing toward the center line L. This is so that the maximum magnetic force is generated by the electromagnet 151 located in the center of the second section 130b and the linearly decreased magnetic forces are generated by the electromagnets 152, 153 located at both lateral sides of the electromagnet 151.

No coil is wound around the cores 144a, 154a located on the center line L. These cores 144a, 154a are dummy cores having zero number of turns.

An electric circuitry 160 is provided in the stiffness generating device 100 in order to apply a current to the coils wound around each core. The electric circuitry 160 includes: an electricity source 161 for applying a current to the coils; and a current regulator 162 as a current regulating means for regulating a magnitude of the current being applied to the coils.

When a current is applied to the coils, the cores and the coils serve as electromagnets. As described above, since the numbers of turns of the coils wound around each core diminish linearly from the uppermost core 141a and the lowermost core 151b toward the center line L, the magnetic forces, which are strongest at the uppermost located core 141a and the lowermost located core 151a and are linearly decreased toward the center line L, are generated. Further, since the winding directions of the coils of the first section 130a and the coils of the second section 130b are different from each other, the magnetic forces that have polarities opposed to each other and the same magnitude are generated.

Referring back to FIG. 2, the reaction portions 123a, 123b of the rotor 120 are configured such that they extend about the uppermost core 141a and the lowermost core 151a somewhat to left and right side cores thereof, respectively. Hereinafter, a position, wherein the arms 122a, 122b of the rotor 120 are aligned in line with the uppermost electromagnet 141 and the lowermost electromagnet 151 and the central portions of the reaction portions 123a, 123b are opposed to the electromagnets 141, 151, is referred to as "a reference posture". Such a reference posture can be used as a beginning position, at which the driven member is driven when the stiffness generating device 100 is installed between the drive motor and the driven member.

The rotating shaft 110 of the stiffness generating device 100 transmits the rotation of the drive motor to the driven member by means of the magnetic forces generated by the electromagnets 140, 150. More specifically, in case the stator 130 is rotated along with the rotation of the drive motor, the arms 122a, 122b and the reaction portions 123a, 123b of the rotor 120 return to the changed reference posture by the magnetic forces accordingly. The rotation of the stator 130 is therefore converted into the rotation of the rotating shaft 110.

As discussed above, the numbers of turns of the coils wound around the uppermost and lowermost cores 141a, 151a are maximum and the numbers of turns of the coils wound around the cores linearly diminish from the uppermost and lowermost cores 141a, 151a toward the center line L. Thus, the magnetic force between the uppermost electromagnet 141 and the lowermost electromagnet 151 is strongest, while the magnetic forces between the opposed magnets are linearly decreased toward the center line L in a circumferential direction of the stator 130. Accordingly, when the stator 130 is rotated at a certain angle, the arms 122a, 122b and the reaction portions 123a, 123b of the rotor 120 are subjected to the smaller magnetic forces than faced to the uppermost and lowermost electromagnets 141, 151. However, since the magnetic force is strongest between the uppermost and lowermost electromagnets 141, 151, the arms 122a, 122b and the reaction portions 123a, 123b of the rotor 120 are subjected to a force that makes them return so as to face the uppermost and lowermost electromagnets 141, 151, i.e., a force restoring them to the reference posture ("restoring force"). Such a force produces a torque applied to the rotating shaft 110 ("restoring torque").

Figure 4:
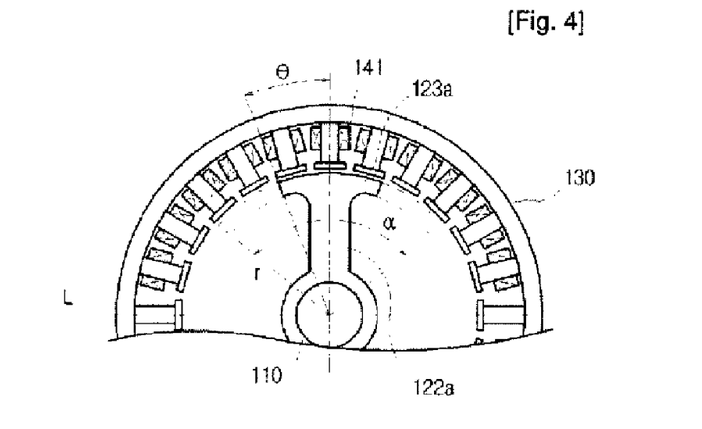
FIG. 4 is a partial sectional view of the stiffness generating device of FIG. 3, which is used for analyzing the stiffness generating device.

FIG. 4 is a sectional view of an upper half portion of the stiffness generating device 100, which is used for analyzing the stiffness generating device 100.

If analyzed under the conditions as depicted in FIG. 4, the restoring torque T can be represented by the following Equation 1.

$$T = \frac{\mu_o r w (N_o I)^2}{g} \left( \frac{8\alpha}{\pi^2} - \frac{16}{\pi} \right) \theta \quad \text{[Equation 1]}$$

wherein, $\theta$ is a rotation angle of the rotor 120, $\alpha$ is an angle that the reaction portion 123a of the rotor 120 occupies along with the rotation of the rotor 120, r is a radius between a center of the rotating shaft 110 and the other end of the rotor 120 (i.e., reaction portion 123a), g is a gap between the rotor 120 and the electromagnet, w is an axial width of the rotor 120, $N_0$ is a maximum number of turns of the coil 150, I is a current applied to the coil 150, and $\mu_0$ is a magnetic permeability.

As shown by Equation 1, since the restoring torque is produced linearly in direct proportion to the rotation angle $\theta$ of the rotor 120, the stiffness generating device 100 can effectuate the same functions as the mechanical rotation spring. However, the rotation angle $\theta$ of the rotor 120 must satisfy a condition of $-\alpha/2 \sim \alpha/2$ in order to satisfy the foregoing Equation 1.

A spring constant K, which is to be obtained from Equation 1, can be represented by the following Equation 2.

$$K = \frac{\mu_o r w (N_o I)^2}{g} \left( \frac{16}{\pi} - \frac{8\alpha}{\pi^2} \right) \theta \quad \text{[Equation 2]}$$

As can be seen from Equation 2, the spring constant K is proportional to the square of the maximum number of turns of the coil and the current I applied to the coil. Accordingly, the spring constant K can be varied by regulating the magnitude of the current applied to the coil. Moreover, the stiffness of the stiffness generating device 100 can be controlled in real time from a state with no stiffness to a state with maximum stiffness, which takes place when the current I is applied at maximum. The magnitude regulation of the current applied to the coils is carried out by the current regulator 162 shown in FIGS. 2 and 3, which has a function of regulating the magnitude of a current.

Numbers of the cores and the numbers of turns of the coils, which are shown in FIGS. 2 and 3, are merely exemplary and the present invention is certainly not limited thereto. As a simpler constitution, the stiffness generating device 100 may have only the uppermost electromagnet 141 and the lowermost electromagnet 151.

Further, in order to enhance the restoring force, another coil may be additionally wound around the arms 122a, 122b. In such a case, the arms 122a, 122b comprised of a magnetic material may serve as an electromagnet if coils are wound around respective arms and a current is applied thereto. In this case, such coils must be wound so that the ends of the arms 122a, 122b or the reaction portions 123a, 123b have a magnetic pole opposed to the magnetic pole formed at the other ends of the electromagnets, which face them. Thus, the restoring force can be enhanced as the electromagnets fixed to the stator 130 and the electromagnets provided at the arms 122a, 122b act together.

Figure 5:
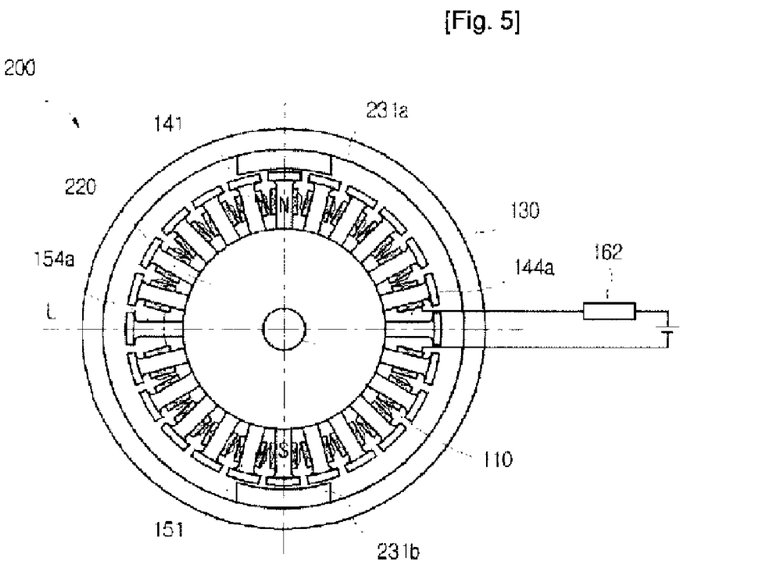
FIG. 5 is a sectional view of an alternative to the stiffness generating device shown in FIG. 3.

FIG. 5 is a schematic sectional view of a stiffness generating device according to a second embodiment of the present invention. The stiffness generating device 200 of this embodiment is similar to the stiffness generating device 100 of the first embodiment except that the electromagnets are fixed to the rotor and the reaction portions acting together with the electromagnets are provided in the stator. Like reference numerals refer to like elements in comparison with the stiffness generating device 100 of the first embodiment and descriptions relating thereto are omitted herein.

A rotor 220 is simply configured as a hub fixed to the rotating shaft 110. The electromagnets are fixed at equal intervals and radially on an outer periphery of the rotor 220. The coil is wound around the core of each electromagnet. Winding arrangement of the coils with respect to the cores is that the numbers of turns are the maximum at the uppermost and lowermost electromagnets 141, 151 and linearly diminish as going toward the center line L. Since the electromagnets are fixed to the rotor 220, winding the coil around the core and assembling the stiffness generating device 200 become more convenient than in the stiffness generating device 100.

The stator 130 includes reaction portions 231a, 231b comprised of a magnetic material on its inner periphery in a direction perpendicular to the center line L. The reaction portions 231a, 231b perform the same function as the reaction portions 123a, 123b. Permanent magnets may be used as the reaction portions 231a, 231b.

Figure 6:
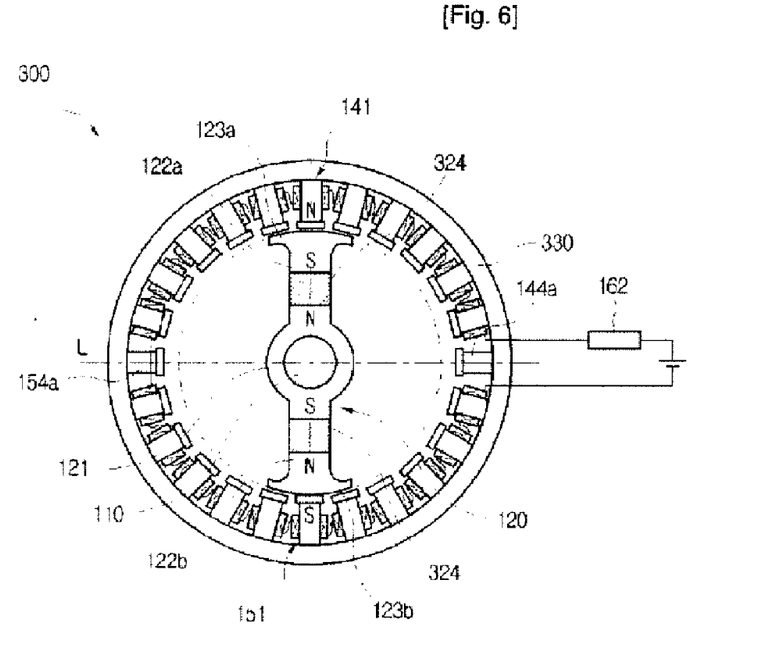
FIG. 6 is a sectional view showing a stiffness generating device according to a second embodiment of the present invention.

FIG. 6 is a sectional view showing a stiffness generating device according to a third embodiment of the present invention.

The stiffness generating device 300 of this embodiment has the same constitution as the stiffness generating device 100 of the first embodiment except that the rotor includes permanent magnets and a cross-sectional shape of the stator is elliptical. Like reference numerals refer to like elements in comparison with the stiffness generating device 100 of the first embodiment and descriptions relating thereto are omitted herein.

The rotor 120 has permanent magnets 324 in each arm 122a, 122b. The permanent magnets 324 are disposed in the arms 122a, 122b so as to correspond to the magnetic poles formed at the ends of the cores facing toward the rotating shaft 110. The permanent magnets 324 may be disposed in the middle of the arms 122a, 122b or may be disposed in the reaction portions 123a, 123b.

A stator 330 is configured as an elliptically cross-sectioned ring or cylinder. The stator is connected to the drive motor so as to be rotated together therewith. The uppermost and lowermost electromagnets 141, 151 with a maximum number of turns are disposed in a direction of the minor axis of the ellipse. Thus, a gap between the rotor 120 and the stator 330 becomes narrowest when they are situated with respect to the reference posture.

The distances between the permanent magnets 324 and the uppermost and lowermost electromagnet 141, 151 among the electromagnets, on which the magnetic force generated by the permanent magnets 324 acts, are the shortest. Thus, when the stator 330 is rotated, the rotor 120 is subjected to the restoring force allowing it to face the uppermost and lowermost electromagnets 141, 151 (i.e., allowing it to return to the reference posture) and the restoring torque is thereby produced in the rotating shaft 110. In this embodiment, since the distances between the permanent magnets 324 and the cores of the uppermost and lowermost electromagnets 141, 151 are the shortest, the stiffness generating device 300 can produce the restoring torque causing the rotor to return to the reference posture in the rotating shaft 110 due to the permanent magnets 324 even when not applying the current to the coils at all.

Figure 7:
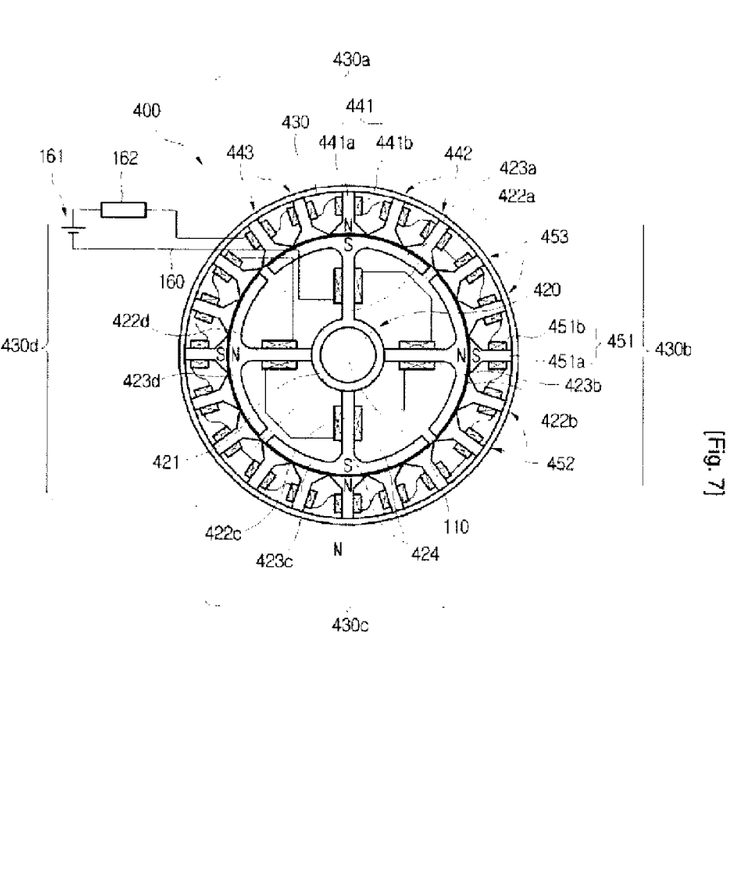
FIG. 7 is a sectional view showing a stiffness generating device according to a third embodiment of the present invention.

FIG. 7 is a sectional view showing a stiffness generating device according to a fourth embodiment of the present invention.

The stiffness generating device 400 of this embodiment has a similar constitution to the stiffness generating device 100 of the first embodiment except that the configuration of the rotor is modified so as to enhance the restoring force of the rotor and the winding arrangement of the coils are modified accordingly. Like reference numerals refer to like elements in comparison with the stiffness generating device 100 of the first embodiment and descriptions relating thereto are omitted herein.

A rotor 420 fixed to the rotating shaft to be rotated together therewith includes the following: a hub 421 fixed to the rotating shaft 110; four arms 422a to 422d extending from the hub 421 at equal intervals and radially outwardly; reaction portions 423a to 423d formed at each distal end of each atm 422a to 422d; and rotor coils 424 wound around respective arms 422a to 422d.

The reaction portions 423a to 423d have a shape of a circular arc. Each of the four reaction portions 423a to 423d is coupled to the distal ends of the arms 422a to 422d at its center, respectively. Thus, an angle of the circular arc shape of each reaction portion 423a to 423d can maximumly form approximate 90°.

A stator 430 has a ring or cylinder shape. The stator is connected to, for example, the drive motor of the robot manipulator to be rotated along with the rotation thereof. A plurality of electromagnets is disposed on an inner periphery of the stator 430 at equal intervals.

The electromagnets include cores and coils wound around the cores. The cores are radially arranged about the center of the rotating shaft 110 and are fixed to the inner periphery of the stator 430 at their respective ends. The coils are wound around respective cores such that the magnetic forces of the electromagnets are linearly varied. Winding arrangement of the coils around the cores will now be described with reference to FIG. 7. For ease of description, each quartered section of the inner periphery of the stator is discriminated as four sections 430a to 430d in FIG. 7.

In case of the first section 430a of the stator, the coils are so wound that N-poles are formed at the ends of the cores facing toward the rotating shaft 110 or the rotor 420, for example. Preferably, the number of turns of the coil 441b wound around the core 441a becomes the maximum and the numbers of turns of the coils wound around respective cores 442, 443 linearly diminish. This is so that the electromagnet 441 located in the center of the first section 430a generates the maximum magnetic force and the electromagnets 442 to 445 located at both lateral sides of the electromagnet 441 generate the linearly decreased magnetic forces as going toward both ends of the first section.

In case of the second section 430b of the stator, the coils are so wound that the opposite magnetic poles (e.g., S-poles) are formed to be opposed to the magnetic poles (e.g., N-poles) formed at the ends of the cores of the electromagnets located in the first section 430a. In other words, the coils are wound around the cores pertaining to the second section 430b in an opposite direction to a winding direction of the coils wound around the cores pertaining to the first section 430a. Further, the electromagnet 451 has the maximum number of rums and the electromagnets 452, 453 located at both lateral sides of the electromagnet 451 have the number of turns linearly diminishing toward the center line L, as in the case of the first section 430a. This is so that the maximum magnetic force is generated by the electromagnet 451 located in the center of the second section 430b and the linearly decreased magnetic forces are generated by the electromagnets 452, 453 located at both lateral sides of the electromagnet 451.

Winding arrangement of the coils in the third section 430c is the same as in the first section 430a. Winding arrangement of the coils in the fourth section 430d is the same as in the second section 430b. Thus, alternately situated two N-poles set and two S-poles set are formed along each quartered section of the inner periphery of the stator. The rotor coils 424 are wound around the rotor interacting with the electromagnets. As such, when a current is applied to the rotor coils 424, the arms 422a to 422d and the reaction portions 423a to 423d of the rotor are magnetized and the arms 422a to 422d, the reaction portions 423a to 423d and the rotor coils 424 can operate as electromagnets. In such a case, the rotor coils 424, which are respectively wound around four arms, are wound around respective arms such that the opposite magnetic poles are formed at respective reaction portions as opposed to the magnetic poles formed at the ends of the cores of the electromagnets, which each arm faces, respectively.

For example, in case of the arm 422a with the reaction portion 423a facing the electromagnets 441, 442, 443 pertaining to the first section 430a, the rotor coil 424 is wound in an opposite direction to the winding direction of the coils pertaining to the first section 430a. Thus, when N-poles are made at the ends of the cores (pertaining to the first section 430a) facing toward the rotating shaft 110, S-pole is made at the reaction portion 423a and an attractive magnetic force acts therebetween.

When in a state shown in FIG. 7, wherein the arms 422a to 422d of the rotor are aligned in line with the electromagnets generating the maximum magnetic forces in respective sections 430a to 430d, this is referred to as a reference posture. If the stator 430 is rotated at a certain angle by the rotation of the drive motor such as the drive motor of the robot manipulator, the restoring force causing the rotor to return to the reference posture acts on the rotor 420 by interaction of the rotor 420 and the electromagnets 441 to 443, 541 to 543.

For example, if the stator 430 is rotated clockwise at a certain angle, an attractive force acts on the reaction portions 423a, 423c of the arms 422a, 422c located in the first section 430a and the third section 430c by the electromagnets of the first section 430a and the third section 430c. However, a repulsive force acts on the reaction portions 423a, 423c of the arms 422a, 422c located in the first section 430a and the third section 430c by the electromagnets of the second section 430a and the fourth section 430c. Thus, the rotating shaft 410 can be rotated in a rotation direction of the stator 430. Furthermore, since the electromagnets located in the center of each section generate the maximum magnetic forces and the magnetic forces are linearly decreased as going toward both ends of each section, the arms and the reaction portions are moved so as to align in line with said electromagnets generating the maximum magnetic forces (i.e., to the reference posture) and the rotating shaft 110 is moved accordingly. Consequently, the rotating shaft 110, which is connected to the driven member such as the link of the robot manipulator, can be rotated along with the rotation of the drive motor. In such a case, as described above, the arms 422a to 422d and the reaction portions 423a to 423d are oriented to the reference posture, thereby providing stiffness to the rotation of the rotating shaft 110.

Further, the coils wound around the cores are not only joined to each other, but are also connected to the electric circuitry 160 including the electricity source 161 and the current regulator 162 for regulating the magnitude of the current. Since the magnitude of the current passing through the coil is regulated by the current regulator 162, the spring constant K is increased or decreased, thereby accomplishing variable stiffness. Furthermore, the rotor coils 424 provided at the rotor 420 are also connected to the electric circuitry 160 as joined to each other, and the magnitude of the current passing therethrough is regulated by the current regulator 162. Alternatively, a separate electric circuitry for applying a current only to the rotor coils 424 may be employed, and a separate current regulator may be employed to regulate the magnitude of the current applied to the rotor coils 424.

The stiffness generating device 400 of this embodiment can enhance the restoring force of the rotating shaft 110 at least 8 times or more when compared with the stiffness generating device 100 of the first embodiment.

Figure 8:
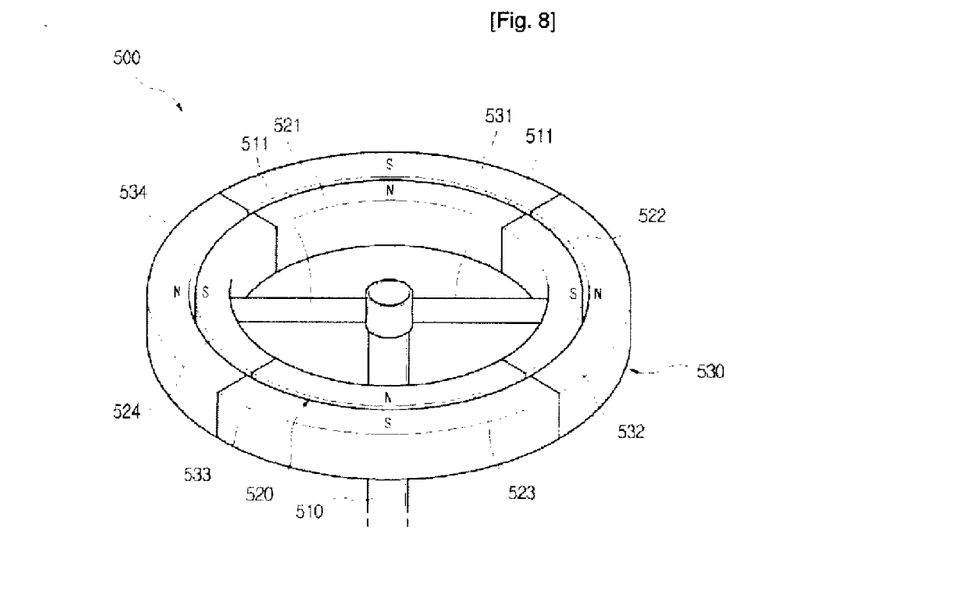
FIG. 8 is a sectional view showing a stiffness generating device according to a fourth embodiment of the present invention.

FIG. 8 is a partially sectional view showing a stiffness generating device according to a fifth embodiment of the present invention.

The stiffness generating device 500 of this embodiment employs permanent magnets as elements for producing the restoring force causing the rotating shaft to be rotated, unlike the stiffness generating devices of the first to fourth embodiments employing electromagnets.

The stiffness generating device 500 comprises: a rotating shaft 510; a rotor 520 fixedly coupled to the rotating shaft 510 to be rotated together therewith; and a stator 530 disposed so as to surround the rotor 520. The rotor 520 and the stator 530 include permanent magnets of the same number.

The stator 530 is connected to the drive motor (e.g., the drive motor of the robot manipulator) to be rotated by the rotation of the drive motor.

The rotating shaft 510 is connected to the driven member (e.g., the link of the robot manipulator) to transmit the rotation of the drive motor to the link. One end of the rotating shaft 510 is provided with a holder 511 for fixing and supporting the rotor 520.

The rotor 520 has a ring-like shape. The rotor includes a plurality of circular-arc-shaped permanent magnets. Four circular-arc-shaped permanent magnets 521 to 524 are provided in this embodiment, as shown.

Each circular-arc-shaped permanent magnet 521 to 524 constituting the rotor 520 is equally sized and dimensioned. Half of the permanent magnets is disposed such that the same magnetic poles are oriented, while the other half of the permanent magnets are disposed as opposed thereto. For example, the permanent magnets 521, 523 form N-poles at their radially inward sides and S-poles at their radially outward sides about the rotating shaft 510. The permanent magnets 522, 524 have a magnetic pole arrangement opposed to that of the permanent magnets 521, 523. Each permanent magnet 521 to 524 is coupled to each other in such a manner that their ends are bonded to each other as their magnetic poles are alternately arranged, thereby forming the rotor 520. However, the configuration of the rotor 520 is not limited as shown. The rotor 520 may be configured such that it is formed as a ring-like member and the circular-arc-shaped permanent magnets are attached to an outer periphery of the ring-like member.

The stator 530 has a ring-like shape. The stator is disposed coaxially with the rotating shaft 510 as constantly spaced apart from the rotor 520. The stator 530 is relatively rotated with respect to the rotating shaft 510 and the rotor 520 by the rotation of the drive motor.

The stator 530 is consisted of as many circular-arc-shaped permanent magnets as the permanent magnets forming the rotor 520.

The circular-arc shapes of the permanent magnets 531 to 534 constituting the stator 530 have the same angles of circular arc as those of the circular-arc-shaped permanent magnets 521 to 524. Each permanent magnet 531 to 534 is disposed radially outward of each corresponding permanent magnet 521 to 524 while having the same magnetic pole arrangement as each corresponding permanent magnet 521 to 524 in a radial direction.

Therefore, when the stator 530 is rotated relatively with respect to the rotor 520, the restoring torque caused by the rotation of the stator 530 is produced in the rotating shaft 510. For example, when the stator 530 is rotated clockwise at a certain angle by the drive motor from the state shown in FIG. 8, an attractive force is produced between the permanent magnet 521 and the permanent magnet 531 by the N-pole formed at the radially outward side of the permanent magnet 521 of the rotor 520 and the S-pole formed at the radially inward side of the permanent magnet 531 of the stator 530. Further, a repulsive force is produced between the permanent magnet 521 and the permanent magnet 534 by the N-pole formed at the radially outward side of the permanent magnet 521 of the rotor 520 and the N-pole formed at the radially inward side of the permanent magnet 532 of the stator 530. Since such attractive and repulsive forces act simultaneously as the restoring force, the restoring torque, which causes the rotor 520 to return to the changed position of the stator 530, is produced in the rotating shaft 510. In this way, stiffness is provided to the rotation of the rotating shaft 510, which operates by the magnetic forces, while the rotation of the drive motor is converted into the rotation of the driven member.

The stiffness generating device 500 includes means for axially displacing a rotor, which is capable of varying the stiffness provided to the rotating shaft 510. The rotor axially displacing means moves the rotor 520 axially with respect to the stator 530 by displacing the rotating shaft 510 in an axial direction. If the rotor 520 is displaced axially with respect to the stator 530, the magnitudes of the magnetic forces of the permanent magnets forming the rotor 520 and the stator 530 become weaker as proportional to such displacement. Thus, in case the rotor 520 and the stator 530 are at the same level, the maximum stiffness of the stiffness generating device 500 is accomplished. Further, the stiffness is decreased with the displacement of the rotor 520 with respect to the stator 530, thereby accomplishing variable stiffness.

Figure 9:
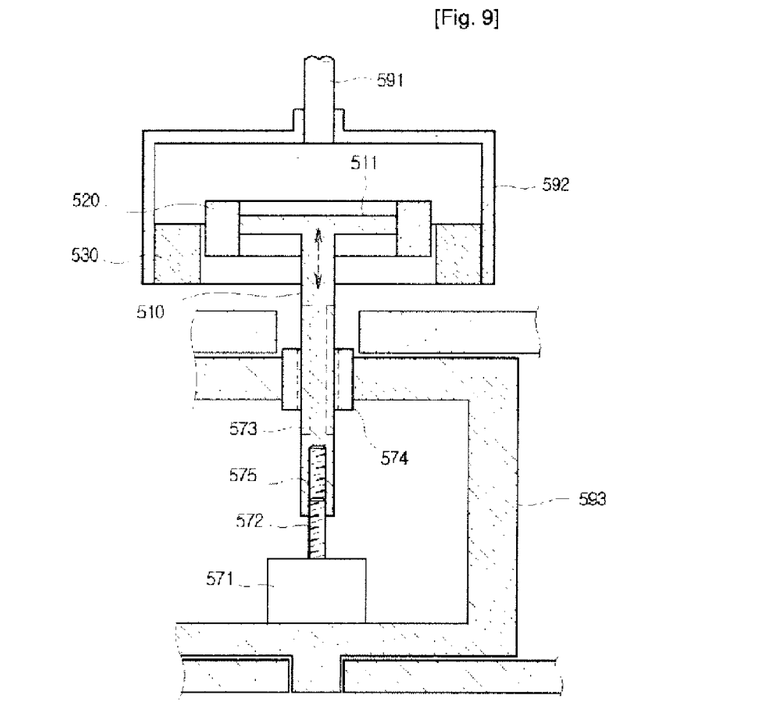
FIG. 9 is a schematic sectional view showing a rotor axially displacing means of the stiffness generating device shown in FIG. 8.

FIG. 9 is a schematic sectional view of the stiffness generating device 500 and illustrates the rotor axially displacing means. Referring to FIG. 9, the rotor axially displacing means includes a rotating shaft driving portion 571, 572 for moving the rotating shaft 510 in an axial direction.

The rotating shaft driving portion 571, 572 includes: a normally and reversely rotating motor 571; and a ball screw 572 formed at a drive shaft of the motor or coupled to the drive shaft of the motor. The motor 571 and the ball screw 572 may be disposed in the driven member connected to the rotating shaft, e.g., the link of the robot manipulator.

In order to effectuate the axial displacement of the rotor 520, the rotating shaft 510 is moved in an axial direction. To this end, a middle portion of the rotating shaft 510 forms a spline groove 573. The spline groove 573 is engaged to a spline boss 574. The spline boss 574 is fixed to a link 593 of a robot manipulator (i.e., driven member). The other end portion of the rotating shaft 510 forms a bore 575, to which the ball screw 572 is screw-engaged.

The stator 530 is joined to an inner periphery of a stator-rotating member 592 coupled to a drive shaft 591 of the drive motor of the robot manipulator.

The rotation of the motor 571 causes the ball screw 572 to be rotated and the rotating shaft 510 is then axially moved in a screw-driving manner, thereby accomplishing the axial displacement of the rotor 520 with respect to the stator 530.

The above-described constitution of the rotor axially displacing means is merely exemplary and the present invention is not limited thereto.

Figure 10:
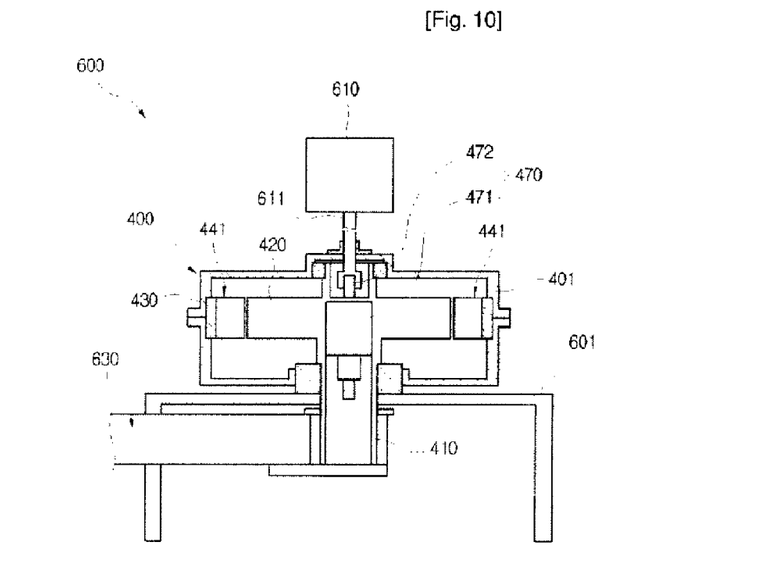
FIG. 10 is a sectional view showing a first embodiment of a joint of a robot manipulator according to the present invention.

FIG. 10 is a schematic sectional view showing a first embodiment of a joint of a robot manipulator, which includes the stiffness generating device 400 according to the fourth embodiment of the present invention.

The joint of a robot manipulator 600 of this embodiment comprises: a drive motor 610 for driving the robot manipulator; a link 630 constituting the robot manipulator; and the stiffness generating device 400 disposed between the drive motor 610 and the link 630, which provides variable stiffness to the rotation of the link while transmitting the rotation of the drive motor 610 to the link 630.

The stiffness generating device 400 includes a housing 401 forming an external appearance. The stator 430 is fixed to an inner periphery of the housing 401. The housing 401 is coupled to a drive shaft 611 of the drive motor 610. The drive motor 610 is fixed to a frame 601 of the robot manipulator. The rotating shaft 410, to which the rotor 420 is fixed, is coupled to the link 630 at its one end.

If the drive motor 610 is rotated, then the stator 430 is rotated. Thereafter, the rotor 420 is rotated along with the rotation of the stator 430 by interaction of the rotor 420 and the electromagnets provided at the stator 430, thereby rotating the link 630. In such a case, stiffness is provided to the rotation of the link 630, as described above. In addition, since the magnitude of the current applied to the coils is regulated, variable stiffness is provided to the rotation of the link 630.

Between the stator 430 and the rotor 420 is provided an encoder 470 as a sensor for measuring relative displacement therebetween. Specifically, a body of the encoder 470 is fixed to the rotor 420 and a shaft 471 of the encoder 470 is coupled to the drive shaft 611 or the housing 401. A torque exerted at the link 630 can be determined using the relative displacement measured by the encoder 470.

Figure 11:
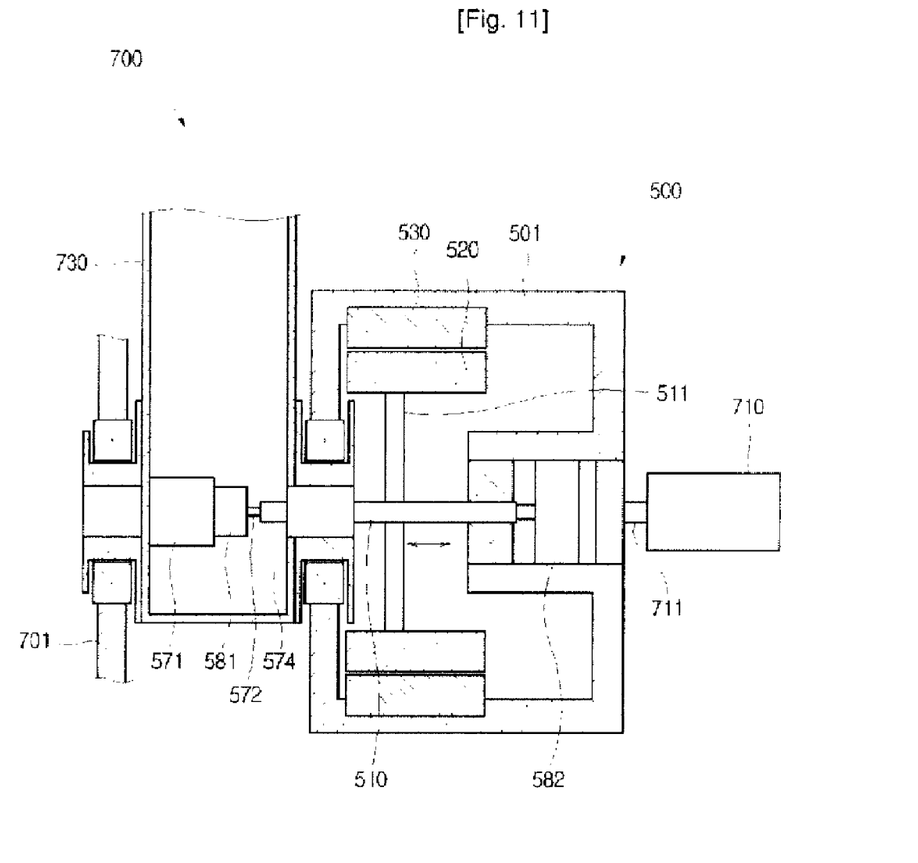
FIG. 11 is a sectional view showing a second embodiment of a joint of a robot manipulator according to the present invention.

FIG. 11 is a schematic sectional view showing a second embodiment of a joint of a robot manipulator, which includes the stiffness generating device 500 according to the fifth embodiment of the present invention.

The joint of a robot manipulator 700 of this embodiment comprises: a drive motor 710 for driving the robot manipulator; a link 730 constituting the robot manipulator; and the stiffness generating device 500 disposed between the drive motor 710 and the link 730, which provides variable stiffness to the rotation of the link while transmitting the rotation of the drive motor 710 to the link 730.

The stiffness generating device 500 includes a housing 501 forming an external appearance. The stator 530 is fixed to the housing 501. The housing 501 is coupled to a drive shaft 711 of the drive motor 710. The drive motor 710 is fixed to a frame 701 of the robot manipulator.

If the drive motor 710 is rotated, then the stator 530 is rotated. Thereafter, the rotor 520 is rotated along with the rotation of the stator 530 by interaction of the electromagnets provided at the rotor 520 and the stator 530, thereby rotating the link 730. In such a case, stiffness is provided to the rotation of the link 730, as described above. In addition, since the rotor 520 can be axially displaced, variable stiffness is provided to the rotation of the link 730. The axial displacement of the rotor 520 is carried out by the rotating shaft driving portion 571, 572 provided inside the link 730.

To the motor 571 of the rotating shaft driving portion is joined an encoder 581 as a sensor for measuring the axial displacement of the rotor 520. Further, between the stator 530 and the rotor 520 is provided an absolute angle encoder 582 as a sensor for measuring relative displacement therebetween. A body of the absolute angle encoder 582 is fixed to the housing 510 and a shaft of the absolute angle encoder 582 is coupled to the rotating shaft 510 of the stiffness generating device 500.

While the present invention has been described and illustrated with respect to a preferred embodiment of the invention, it will be apparent to those skilled in the art that variations and modifications are possible without deviating from the broad principles and teachings of the present invention which should be limited solely by the scope of the claims appended hereto.

INDUSTRIAL APPLICABILITY

The stiffness generating device according to the present invention can be applied to a robot manipulator. Since the stiffness generating device generates variable stiffness, the robot manipulator can operate with lower stiffness to thereby ensure safety by a spring effect when contact with the outside is needed. Further, the robot manipulator can operate with higher stiffness when a high-speed operation is necessary. Consequently, the stiffness generating device according to the present invention can be applied to each joint of a manipulator of a robot such as a service robot, which must ensure safety during interaction with human.

The invention claimed is:

1. A device for generating stiffness, comprising:
a rotating shaft connected to a driven member;
a rotor fixed to the rotating shaft and having arms comprising a magnetic element;
a stator disposed so as to surround the rotor outside the arms and being connected to a drive motor for driving the driven member to be rotated by a rotation of the drive motor;
a plurality of electromagnets fixed to an inner periphery of the stator so as to be apart from the arms by a predetermined gap and to be opposed to each other about the rotating shaft, each electromagnet having a core radially oriented with respect to the rotating shaft and a coil wound around the core; and means for applying a current to the coils;

wherein the coils of one half of the electromagnets are wound so that N-poles are formed at ends thereof facing toward the rotating shaft, and wherein the coils of the other half of the electromagnets are wound so that S-poles are formed at ends thereof facing toward the rotating shaft.

2. The device of claim 1, wherein the electromagnets forming the N-poles are fixed to one of halved sections of the inner periphery of the stator and the electromagnets forming the S-poles are fixed to the other of the halved sections, and wherein the electromagnets in each halved section are configured so that the coils thereof are wound in such number of turns as linearly diminish from the electromagnet located centrally toward the electromagnets located laterally.

3. The device of claim 2, wherein each arm has a permanent magnet and the stator has an elliptical cross-section.

4. The device of claim 2, wherein the rotor further has a rotor coil wound around the arm and the current applying means applies a current to the rotor coil.

5. The device of claim 1, wherein the rotor has four arms, wherein the electromagnets forming the N-poles are fixed to two opposed sections of quartered sections of the inner periphery of the stator and the electromagnets forming the S-poles are fixed to the other of the quartered sections, and wherein the electromagnets in each quartered section are configured so that the coils thereof are wound in such number of turns as linearly diminish from the electromagnet located centrally toward the electromagnets located laterally.

6. The device of claim 5, wherein the rotor further has a rotor coil wound around the arm and the current applying means applies a current to the rotor coil.

7. The device of claim 1, wherein the device further comprises a current regulating means disposed between the current applying means and the coils for regulating a magnitude of a current being applied to the coils.

8. A device for generating stiffness, comprising:
a rotating shaft connected to a driven member;
a cylindrical rotor fixed to the rotating shaft;
a plurality of electromagnets fixed to an outer periphery of the rotor, each electromagnet having a core radially oriented with respect to the rotating shaft and a coil wound around the core;
a stator disposed so as to surround the rotor outside the electromagnets and being connected to a drive motor for driving the driven member so as to be rotated by a rotation of the drive motor, the stator having a magnetic element on an inner periphery thereof; and means for applying a current to the coils;

wherein the coils of one half of the electromagnets are wound so that N-poles are formed at ends thereof facing toward the rotating shaft, and wherein the coils of the other half of the electromagnets are wound so that S-poles are formed at ends thereof facing toward the rotating shaft.

9. The device of claim 8, wherein the electromagnets forming the N-poles are fixed to one of halved sections of the outer periphery of the rotor and the electromagnets forming the S-poles are fixed to the other of the halved sections, and wherein the electromagnets in each halved section are configured so that the coils thereof are wound in such number of turns as are linearly reduced from the electromagnet located centrally toward the electromagnets located laterally.

10. The device of claim 9, wherein the device further comprises a current regulating means disposed between the current applying means and the coils for regulating a magnitude of a current being applied to the coils.

11. A device for generating stiffness, comprising:
a rotating shaft connected to a driven member;
a ring-like rotor fixed to the rotating shaft and including even permanent magnets; and
a stator disposed so as to surround the rotor coaxially with the rotating shaft and being connected to a drive motor for driving the driven member to be rotated by a rotation of the drive motor, the stator including as many permanent magnets as the permanent magnets of the rotor.

12. The device of claim 11, wherein the device further comprises a rotor displacing means for moving the rotor relatively with respect to the stator in an axial direction of the rotating shaft.

13. The device of claim 12, wherein the rotor displacing means comprises a screw axially screw-engaged to the rotating shaft and a motor for driving the screw.

14. A joint of a robot manipulator for connecting a link constituting a robot manipulator and a drive motor having a drive shaft and driving the drive shaft, the joint comprising the device for generating stiffness of any one of claims 1 to 13,
wherein the rotating shaft of the device is connected to the link and the stator of the device is connected to the drive shaft.

15. The joint of a robot manipulator of claim 14, wherein the joint further comprises a sensor fixed to one of the rotor and the stator for detecting a relative displacement between the rotor and the stator.

* * * * *